Patented Mar. 11, 1952

2,588,336

UNITED STATES PATENT OFFICE 2,588,336

PURIFICATION OF GENTISIC ACID

Ferdinand C. Meyer, Kirkwood, Mo., assignor to Monsanto Chemical Company, St. Louis, Mo., a corporation of Delaware No Drawing. Application March 18, 1950, Serial No. 150,537

10 Claims. (Cl. 260—521)

This invention relates to 2,5-dihydroxy benzoic acid, or as it is more common called, gentisic acid. More specifically, this invention relates to an improvement in the process for the purification of crude gentisic acid.

Gentisic acid has enjoyed wide spread utility as a pharmaceutical. While a number of methods are disclosed in the art for the preparation of gentisic acid, the most commonly used methods are the Kolbe reaction involving the carboxylation of an alkali metal salt of hydroquinone with $CO_2$ under pressure, the decomposition with water of the diazonium salt of 2-hydroxy-5-aminobenzoic acid and the oxidation of salicylic acid with potassium persulfate in alkaline solution. In each of these reactions a considerable quantity of highly colored, tarry side products are formed along with gentisic acid. In order that the gentisic acid may be utilized in pharmaceutical preparations, it is necessary that the gentisic acid be isolated from such highly colored and tarry reaction products. Since the reaction mixture obtained in the various processes utilized for the production of gentisic acid usually consists of gentisic acid or its alkali metal salt contained in an aqueous medium, recovery and purification of the gentisic acid from such an aqueous medium by solvent extraction would appear to be most feasible. It has been found, however, that the usual solvents utilized in such a solvent extraction process, such as ether, butanol, isobutanol, benzene, etc., are also good solvents for the tarry by-products formed with gentisic acid. Purification by solvent extraction and recrystallization according to the methods heretofore used has, therefore, been an exceedingly costly unit operation, frequently requiring as many as three, four and five separate and distinct extractions and recrystallizations in order to obtain substantially pure, white crystals of gentisic acid. Since each such unit operation necessarily results in some loss of product, the yield of gentisic acid has been undesirably low and the cost exceedingly high.

It is an object of this invention to provide an improvement in the process for the recovery and purification of gentisic acid.

Further objects will become apparent from the description of the novel process of this invention.

It has now been discovered that while gentisic acid is exceedingly soluble in diisopropyl ether, the tarry and highly colored by-products which are formed during the preparation of gentisic acid, are relatively insoluble in diisopropyl ether. Thus, according to the novel process of this invention, substantially pure gentisic acid is recovered from crude gentisic acid by extracting crude gentisic acid with diisopropyl ether. The processes for the preparation of gentisic acid customarily result in a crude gentisic acid or its alkali metal salt contained in an aqueous medium. According to a preferred embodiment of this invention, the pH of the aqueous medium containing crude gentisic acid or its alkali metal salt is adjusted to a pH of below about 2.5 in order to convert any of the salts of gentisic acid to gentisic acid. The aqueous medium thus obtained is then extracted with diisopropyl ether. The diisopropyl ether extract is then separated from the aqueous medium and the gentisic acid contained therein recovered.

The following examples are illustrative of the improvement in the process for the recovery and purification of gentisic acid, which is the subject of this invention:

Example I

An iron autoclave was charged with 55 parts by weight of hydroquinone, 84 parts by weight of sodium bicarbonate, and 100 parts by weight of water. The autoclave was swept clear of air with $CO_2$ and a pressure of 200 pounds per square inch was applied. With constant agitation the autoclave was heated to about 150–200° C. At this temperature the pressure rose to approximately 600 pounds per square inch, at which temperature and pressure the reaction was maintained for 12 hours.

The autoclave was then cooled, vented, and the reaction mixture filtered, and unreacted hydroquinone recovered. The filtrate which contained the sodium salt of gentisic acid was then acidified to a pH of about 2.5 with concentrated hydrochloric acid. The acidified filtrate was heated to a temperature of about 50° C. and the gentisic acid extracted with three 100 parts by weight portions of diisopropyl ether. The diisopropyl ether extractions were combined, the ether evaporated and gentisic acid recovered. Recrystallizing the recovered gentisic acid from water yields white needle crystals of gentisic acid having a melting point of 205–206° C.

Example II

To a solution of 8.0 g. of sodium hydroxide in 200 ml. of water was added 30.6 g. of 2-hydroxy-5-aminobenzoic acid. 15.2 g. of sodium nitrite was then added and the mixture stirred until all of the solids were dissolved. This mixture was then slowly added to a solution of approximately 50 g. of 98% sulfuric acid in 100 ml. of water while maintaining a temperature of approximately 0° C., thereby forming a slurry of the diazonium salt.

The diazonium salt was then decomposed by slowly adding the slurry to a boiling solution of approximately 230 g. of 98% sulfuric acid in 100 ml. of water. The pH of the solution of gentisic acid thus obtained was below 2.5 and the gentisic acid was extracted from the solution with three 100 g. portions of diisopropyl ether. The diisopropyl ether extracts were combined, the ether evaporated and gentisic acid recovered. Recrystallizing the recovered gentisic acid from water yielded fine white needle crystals of gentisic acid having a purity comparable to that obtained in Example I.

*Example III*

30 g. of salicylic acid was dissolved in a solution of 41.3 g. of sodium hydroxide in 500 ml. of water. 1.5 g. of $FeSO_4$ was dissolved in a minimum amount of water and added to the solution of sodium salicylate. The mixture was cooled to about 15–20° C. and 63 g. of potassium persulfate slowly added. The reaction mixture was maintained at a temperature of 15–20° C. for about 15–20 minutes with continuous stirring, after which time the temperature was raised to about 50–55° C., at which temperature it was maintained for about 12 hours.

The solution was then acidified with concentrated HCl to a pH of 3–4 and cooled to about 10° C. Unreacted precipitated salicylic acid was removed by filtration. The filtrate was extracted three times with diethyl ether to remove any further unreacted salicylic acid. The aqueous solution was then acidified to a pH of approximately 1.0 with concentrated HCl, heated to a temperature of about 100° C., at which temperature it was maintained for about 30 minutes. The solution was then allowed to cool to about 70° C. and gentisic acid extracted with three 100 g. portions of diisopropyl ether. The diisopropyl ether extracts were combined, the ether evaporated and gentisic acid recovered. Recrystallizing the recovered gentisic acid from water yields fine white needle crystals of gentisic acid comparable in purity to that obtained in Example I.

While specific quantities and temperatures have been set forth in the preceding examples, the novel process of this invention is subject to substantial variations. For example, in adjusting the pH of the aqueous medium containing crude gentisic acid below about 2.5, any of the mineral acids may be utilized, such as sulfuric acid, hydrochloric acid, phosphoric acid, etc. The purpose in maintaining such a low pH in the aqueous medium is to insure the conversion of all of the salt of gentisic acid in the aqueous medium to gentisic acid since diisopropyl ether will not extract the salts of gentisic acid.

The concentration of the crude gentisic acid in the aqueous medium is subject to wide variation, and this concentration is not of a critical nature. The gentisic acid may be in complete solution or it may be partly in solution and partly in suspension.

The temperature of the actual extraction operation may also be varied over wide limits. Preferably, however, the extraction is carried out at a temperature in the range of from about 25° C. to the boiling point of diisopropyl ether, about 70° C. The temperature itself is not of a critical nature. The higher temperatures are preferred because of the increased solubility of the gentisic acid in the diisopropyl ether at elevated temperatures.

The gentisic acid contained in the diisopropyl ether after the extraction process may be recovered therefrom by any of the methods well known to those skilled in the art. Gentisic acid may be recovered directly by merely evaporating the diisopropyl ether. If desired, the diisopropyl ether solution of gentisic acid may be treated with an aqueous solution of an alkali metal hydroxide and an alkali metal carbonate to convert the gentisic acid to an alkali metal salt of gentisic acid which then dissolved in the aqueous phase. The aqueous phase may then be separated from the diisopropyl ether and the alkali metal salt of gentisic acid recovered therefrom.

What is claimed is:

1. In the process for the purification and recovery of substantially pure 2,5-dihydroxy benzoic acid from crude 2,5-dihydroxy benzoic acid contained in an aqueous medium, the step comprising extracting the 2,5-dihydroxy benzoic acid with diisopropyl ether.

2. In the process for the purification and recovery of substantially pure 2,5-dihydroxy benzoic acid from crude 2,5-dihydroxy benzoic acid contained in an aqueous medium, the steps comprising adjusting said aqueous medium to a pH of below about 2.5 and extracting the 2,5-dihydroxy benzoic acid with diisopropyl ether.

3. In the process for the purification and recovery of substantially pure 2,5-dihydroxy benzoic acid from crude 2,5-dihydroxy benzoic acid obtained by the carboxylation of an alkali metal salt of hydroquinone with $CO_2$, the step comprising extracting said crude 2,5-dihydroxy benzoic acid contained in an aqueous medium with diisopropyl ether.

4. In the process for the purification and recovery of substantially pure 2,5-dihydroxy benzoic acid from crude 2,5-dihydroxy benzoic acid obtained by the carboxylation of an alkali metal salt of hydroquinone with $CO_2$ and contained in an aqueous medium, the steps comprising adjusting said aqueous medium to a pH of below about 2.5 and extracting the 2,5-dihydroxy benzoic acid with diisopropyl ether.

5. In the process for the purification and recovery of substantially pure 2,5-dihydroxy benzoic acid from crude 2,5-dihydroxy benzoic acid contained in an aqueous medium, the steps comprising adjusting said aqueous medium to a pH of below about 2.5 with a mineral acid and extracting the 2,5-dihydroxy benzoic acid with diisopropyl ether.

6. The process as described in claim 5 wherein the mineral acid is hydrochloric acid.

7. The process as described in claim 5 wherein the mineral acid is sulfuric acid.

8. In the process for the purification and recovery of substantially pure 2,5-dihydroxy benzoic acid from crude 2,5-dihydroxy benzoic acid obtained by the carboxylation of an alkali metal salt of hydroquinone with $CO_2$ and contained in an aqueous medium, the steps comprising adjusting said aqueous medium to a pH of below about 2.5 with a mineral acid and extracting the 2,5-dihydroxy benzoic acid with diisopropyl ether.

9. The process as described in claim 8 wherein the mineral acid is hydrochloric acid.

10. The process as described in claim 8 wherein the mineral acid is sulfuric acid.

FERDINAND C. MEYER.

REFERENCES CITED

The following references are of record in the file of this patent:

Senhofer et al.: Beilstein (Handbuch, 4th ed.), vol. 10, p. 384 (1927).

Fife et al.: Ind. Eng. Chem., vol. 22, pp. 513–515 (1930).